Patented June 20, 1950

2,512,385

UNITED STATES PATENT OFFICE 2,512,385

FLAVOR DEVELOPING COMPOSITION

David B. Sabine, Yonkers, N. Y., assignor to The Arlington Chemical Company, a corporation of New York No Drawing. Application August 31, 1949, Serial No. 113,471

2 Claims. (Cl. 99—16)

This invention relates to a flavor developing composition for foods, particularly to a composition for enhancing the flavor-increasing property of ammonium glutamate when applied to or mixed into food products.

Sodium glutamate is extensively used for bringing out the flavor of foods. It is used, for instance, to enhance the natural flavor of meats or other foods. Glutamic acid for this purpose is unsatisfactory. So also is ammonium glutamate. They give an objectionable sharp or sour taste.

I have now discovered that ammonium glutamate may be made into a satisfactory flavor-increasing agent provided it is mixed with glutamic acid.

The mixture of ammonium glutamate and glutamic acid is useful in developing the flavor of foods for persons who are restricted to a sodium-free or low sodium diet, as in cases of hypertension, pathological cardiovascular condition, and edema.

Briefly stated the invention comprises a flavor developing composition including ammonium glutamate and glutamic acid. In a modification, the invention comprises the use of these two components along with glycine, the glycine serving further to increase the effectiveness of the composition in increasing the flavor of certain food products.

The exact proportion of the materials to be used depends upon the effectiveness required per unit of weight in developing the flavor of the food product. In any case the proportions must be within the range 10–100 parts of glutamic acid for 100 parts of ammonium glutamate. When glycine is used it is employed also in the proportion of 10–100 parts for 100 of the glutamate. Proportions here and elsewhere herein are expressed as parts by weight.

The invention will be further illustrated by description in connection with the following specific examples of the practice of it.

Example 1

There was formed a mixture of the several ingredients in the following proportions: ammonium glutamate 66.6 parts, glutamic acid 16.7, and glycine 16.7. The materials are supplied to the mixture in approximately dry form.

The materials of the proportions shown were thoroughly mixed in a mechanical mixer. The resulting mixture was then milled to pass through a 20-mesh screen.

In use, the milled product is sprinkled on or mixed with the food in which the flavor is to be developed.

Example 2

The procedure of Example 1 is followed except that the proportion of ammonium glutamate used is 100 parts and the proportions of the other materials are selected from within the following ranges shown, the glycine being not in excess of the glutamic acid.

| | Parts |
|---|---|
| Glutamic acid | 10–100 |
| Glycine | 10–100 |

Example 3

The procedure of Example 1 is followed except that the proportion of ammonium glutamate used is 100 parts and the proportions of the other materials are selected from within the following ranges:

| | Parts |
|---|---|
| Glutamic acid | 20–50 |
| Glycine | 20–50 |

Example 4

Example 1 was followed except that the glycine was omitted.

Example 5

The procedure and proportions of any one of Examples 1 to 4 were used except that there was added 0.6 part of dry corn starch to 100 parts of other ingredients of the mixture. After the mixing and milling as described the starch is found to be well distributed throughout the resulting milled material. The starch serves in this product as an agent to preserve the free-flowing properties of the product when used in a salt-shaker type of dispenser.

The product made as described in either Examples 1–5 is a more effective and satisfactory flavor-increasing agent per unit of weight than is ammonium glutamate or other component alone. In fact, each of the ingredients alone is unsatisfactory in developing the desired natural flavor of the food.

As an explanation of the results obtained I consider the ammonium glutamate and glutamic acid so to modify the effect of each as to destroy objectionable taste and bring out to the fullest possible extent the flavor of the food to which the mixture is added.

The glycine is considered to provide a buffer effect for the acidity of glutamic acid without affecting appreciably the pH of it in aqueous solution.

It will be understood also that it is intended to cover all changes and modifications of the examples of the invention herein chosen for the purpose of illustration which do not constitute departures from the spirit and scope of the invention.

What I claim is:

1. A composition of matter, for developing the flavor of food products, comprising a mixture of ammonium glutamate and glutamic acid, the glutamic acid serving to increase the flavor developing property to a level above that for ammonium glutamate alone and above that for glutamic acid alone, the proportion of glutamic acid being 10 to 100 parts for 100 of ammonium glutamate.

2. A composition of matter, for developing the flavor of food products, comprising ammonium glutamate, glutamic acid, and glycine, the proportions being 10 to 100 parts of glutamic acid and 10 to 100 parts of glycine for 100 of the ammonium glutamate.

DAVID B. SABINE.

REFERENCES CITED

The following references are of record in the file of this patent:

UNITED STATES PATENTS

| Number | Name | Date |
|---|---|---|
| 1,015,891 | Ikeda et al. | Jan. 30, 1912 |
| 1,035,591 | Ikeda et al. | Aug. 13, 1912 |

FOREIGN PATENTS

| Number | Country | Date |
|---|---|---|
| 269,576 | Great Britain | Aug. 25, 1927 |